Sept. 14, 1948.     L. B. DOANE ET AL     2,449,369
FLEXIBLE METAL HOSE
Filed Jan. 8, 1945
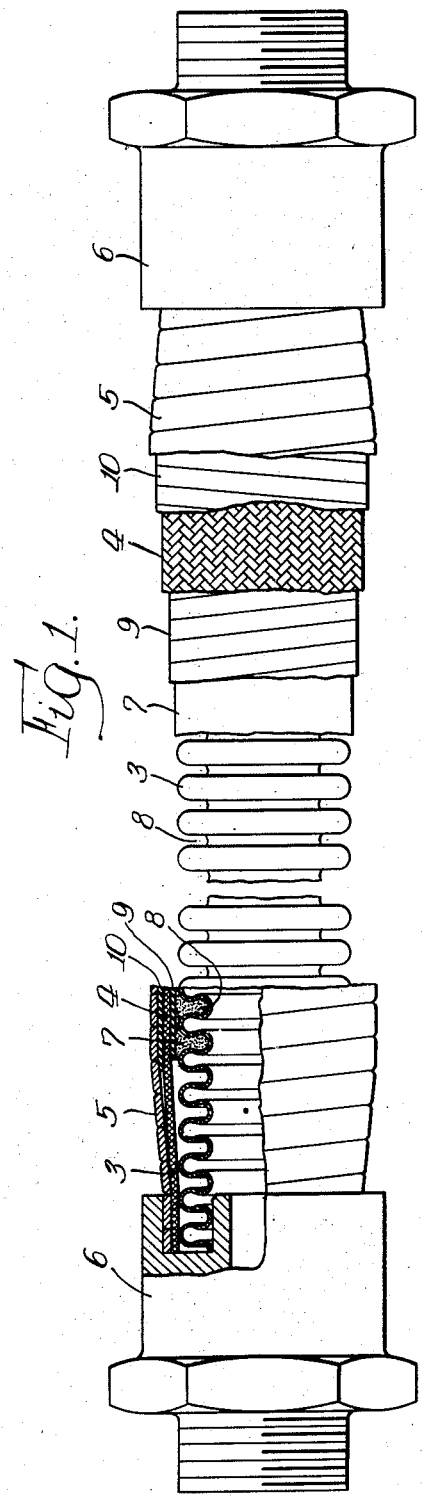
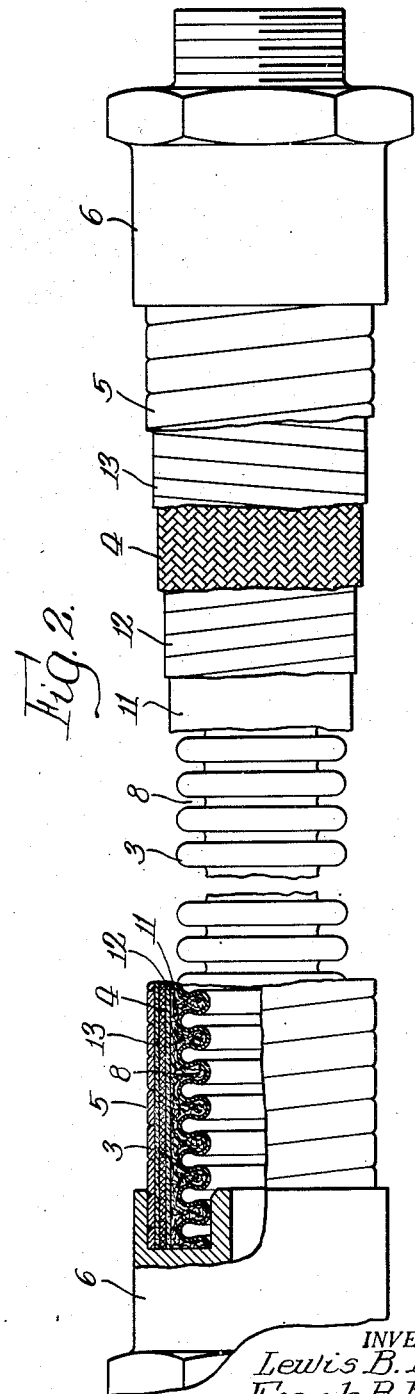
INVENTORS.
Lewis B. Doane,
Frank B. Bentley
BY Patented Sept. 14, 1948

2,449,369

UNITED STATES PATENT OFFICE 2,449,369

FLEXIBLE METAL HOSE

Lewis B. Doane and Frank B. Bentley, New London, Conn., assignors to Electric Boat Company, Groton, Conn., a corporation of New Jersey Application January 8, 1945, Serial No. 571,771

7 Claims. (Cl. 138—58)

This invention relates to hose and has to do with flexible metal hose.

Flexible metal hose is widely used for various purposes. As at present made, flexible metal hose comprises an inner metal tube corrugated circumferentially so as to be readily flexible, this tube being enclosed by a braided wire sheath serving to protect the tube against abrasion and other damage, the end portions of the tube and the sheath being welded or brazed in end fittings for connecting the hose into a system or to a machine, the braided sheath also serving to restrain the corrugated tube against lengthwise stretching when it is subjected to internal pressure. This type of metal hose is preferred in many instances to rubber hose, since it can be used to conduct fluid which would chemically attack rubber and is not adversely affected by temperatures sufficiently high to injure rubber. Also, flexible metal hose of the character stated may readily be designed for conducting fluids at high pressure, for which purpose the hose may be provided with an outer flexible armour of high tensile strength, and has the advantage of greater flexibility than a reenforced rubber hose designed for equally high pressure.

Flexible metal hose such as above referred to is frequently used to make connection to a machine which vibrates when in operation, such as, for example, a compressor. The machine may be mounted on flexible supports, commonly rubber, so that vibration will not be transmitted to the supporting structure. In such cases the tubing or piping connections must also be flexible. Flexible metal hose is well suited for that purpose, since it will accommodate considerable amplitude of motion.

While the flexible hose of our invention has wide application, we shall, for purposes of description, refer specifically to its use with a compressor or analogous machine. Such a machine, in addition to its low frequency vibration arising from reciprocating forces or from unbalance, also acts as a source of high frequency vibration in the audible range—say, from 100 to 5000 or even 10,000 cycles per second. These high frequency vibrations are caused by impact or by sliding of the working parts and, in a compressor, by turbulent motion of the fluids. If vibration in the audible range of frequencies is not isolated at the machine, it may appear as objectionable noise at some remote point. That may be highly objectionable in certain cases—for example, machines installed in submarine boats must be sound isolated to avoid propagation of water-borne noise from the hull. Also, machines installed in residential buildings and utilizing flexible metal hose should be sound isolated to assure comfortable conditions throughout the building. It has been demonstrated by experiment and investigation that commercial metallic hose of the character above referred to does not prevent the transmission of sonic or audible vibration. Attenuation of the noise level through any practicable length of such hose is very slight, being comparable to that occurring in solid metallic pipe. In this respect, metallic hose is greatly inferior to rubber hose.

Our invention is directed to the provision of flexible metallic hose of such character as effectively to damp out vibration and thus isolate noise at the machine to which the hose is connected, so that the metal hose is as efficient in that respect as any type of rubber hose while being superior thereto in certain respects above referred to, particularly in its ability to withstand the action of various fluids which would attack rubber and to withstand much higher temperatures than rubber can withstand, while possessing adequate mechanical strength. In carrying our invention into effect, we construct flexible metal hose in substantially the same manner as present day hose above referred to, but provide means effective for damping out the objectionable vibration which otherwise would be transmitted through the hose. More specifically, we provide the interior corrugated tubing of the hose with a covering of a character to damp out vibration thereof, the material of the covering preferably extending into the exteriorly opening corrugations of the tube and also being in close contact with the braided sheath thereof for damping out vibration of the latter. In the case of hose intended for high pressure work, in which an armor of high tensile strength is disposed about the sheath, the latter is provided with a covering of a material which also is in close contact with the flexible armor, effective for damping out vibration of the latter and of the sheath. In all cases, the damping material employed is of such character that the flexibility of the hose is not interfered with, the hose as a whole being readily flexible. Further objects and advantages of our invention will appear from the detail description.

In the drawings:

Figure 1 is a view partly in section and partly in elevation of a flexible metal hose embodying our invention; and Figure 2 is a view like Figure 1 but showing a different vibration damping material than is used in Figure 1.

Referring first to Figure 1, the hose comprises a suitable length of circumferentially corrugated metal tubing 3, bronze for example, a protective braided wire sheath 4 surrounding the tubing 3, and a flexible pressure resistant armor 5, formed in a known manner, surrounding the sheath 4. The hose constructed in this manner is intended for high pressure use and, when the hose is to be used for handling fluid under moderate or low pressures, the armor 5 may be omitted, as will be explained more fully later. The end portions of the tubing 3, sheath 4, and armor 5, extend into suitable fittings 6 secured thereon by soldering or brazing in a known manner. The hose so far described is a readily flexible all metal hose and is of known construction. While this hose is highly efficient in certain respects it is open to the objection, above referred to, that it readily transmits vibrations within the audible frequency range, which is objectionable for the reasons above noted.

Our invention is directed particularly to preventing transmission through the metal hose of vibrations within the audible frequency range, as above noted. To that end, we provide the corrugated metal tubing 3 with a coating 7 of a vibration damping material, of such character effectively to damp out vibration of the tubing 3 while not interfering with ready flexing or bending thereof. The coating 7 is formed of a rubber cement, comprising a solution of crude rubber in a volatile solvent. This cement flows into the exteriorly opening corrugations 8 of the tubing 3 so as to fill such corrugations. The corrugations are packed full of the cement, a layer of which is then applied over the outside of tubing 3, which is then wrapped with adhesive rubber tape of known type, providing a wrapping 9 enclosing the rubber cement and retaining it in position. The rubber cement used is of a type which remains permanently more or less viscous, the crude rubber of the cement adhering to the corrugations of the tubing 3 being effective for damping out any vibrations thereof. That, in conjunction with the outer layer of the rubber cement and the wrapping 9 of rubber tape, assures damping out of substantially all vibration of the tubing 3 which otherwise would be transmitted therethrough. After the rubber cement and the wrapping 9 have been applied to the tubing 3, the braided wire 4 is applied in such a manner as to be in close contact with wrapping 9, the latter serving to damp out vibrations of sheath 4, the latter due to its braided construction not being a good transmitter of vibrations. A wrapping 10 of adhesive rubber tape is applied over the braided sheath 4, after which the armor 5 is applied in close contact with the wrapping 10, the ends of tubing 3, sheath 4 and armor 5 being then soldered or brazed in the end fittings 6, as above stated. The wrapping 10 provides a further safeguard against transmission of vibration through sheath 4 and also exerts a damping effect on armor 5 so as to prevent objectionable transmission of vibration therethrough.

If the hose is to be used for moderate or low pressure work, the armor 5 may be omitted, in which case the wrapping 10 of adhesive rubber tape may also be omitted. The hose then comprises a corrugated length of tubing 3 and the braided sheath 4, with the coating 7 of the rubber cement or like material and the wrapping 9 of adhesive rubber tape. It will be noted that coating 7 and wrapping 10 terminate a short distance from each end of the length of tubing 3, so as to avoid injury thereto by the heat incident to soldering or brazing the fittings 6 on the ends of the hose. While we prefer that the rubber cement of the coating 7 remain in a more or less thick viscous condition, that is not essential, since if the solvent is substantially evaporated from the rubber cement, the crude rubber remains and extends over and about and between the corrugations of the tubing 3 to which it adheres, being highly efficient for damping out vibration of this tubing. From what has been said, it will be understood that the hose of Figure 1 is intended to be used at temperatures which would be noninjurious to the rubber or rubber-like damping material and, when the armor 5 is provided, is suitable for use under high pressure condition.

The hose of Figure 2 is similar in construction to that of Figure 1 with the exception of the vibration damping material used. Instead of using rubber or rubber cement, or like material, the corrugated tubing 3 is provided with a coating 11 of rock wool or like material resistant to heat, which is more or less soft and yielding, which is packed tightly into the exteriorly opening corrugations of the tubing 3 and extends over the exterior thereof beyond the corrugations in a layer of substantial depth or thickness. About the coating 11 a vibration damping heat resistant material, in the form of a tape, is wrapped to provide a wrapping 12, glass-fabric tape or like material being used for that purpose. This wrapping 12 serves effectively to retain the coating 11 in position, supplementing the vibration damping effect of coating 11 and also serving to damp out any vibrations which might otherwise be transmitted through the sheath 4. When the hose is provided with a pressure resistant armor 5, a wrapping 13, also of glass-fabric tape or like material, is wound about the sheath 4 and has close contact with the armor 5 so as to damp out vibrations thereof, either completely or sufficiently to prevent objectionable vibration being transmitted by the armor. Since the vibration damping material utilized in the hose of Figure 2 is heat resistant, such material may continue to the ends of the tubing 3, sheath 4 and armor 5. If the hose is to be used for moderate or low pressure operations, the armor 5 and the wrapping 13 may be omitted, as before.

By providing the hose with vibration damping material, particularly the inner corrugated tubing 3 thereof, objectionable transmission of vibration through the hose is eliminated. The ordinary flexible metal hose now commonly used effects negligible attenuation of vibration in the audible range, as above noted. By contrast, tests show that a flexible metal hose constructed in accordance with our invention, one foot in length, effects an attenuation of vibration in the audible range of from 14 to 20 decibels, equivalent to an absorption of from 95% to 99% of sound energy input at the vibrating end of the hose. That result is comparable to the result obtained by the use of rubber hose, with respect to suppressing or damping out vibration in the audible range, in addition to which the flexible metal hose of our invention is superior to rubber hose in its ability to withstand higher temperatures, in the form thereof using heat resistant vibration damping material, its resistance to many substances which would be injurious to rubber, and its greater flexibility when used for high pressure operations compared to reenforced rubber hose used for that purpose.

As above indicated, and as will be understood by those skilled in this art, changes in construction and arrangement of parts of our invention may be resorted to without departing from the field and scope thereof, and we intend to include all such variations, as fall within the scope of the appended claims, in this application in which the preferred forms only of our invention have been disclosed.

We claim:

1. In a flexible metal hose, a circumferentially corrugated length of metal tubing, and a viscous vibration damping material substantially filling the exteriorly opening corrugations of said tubing effective for substantially damping out vibration thereof.

2. In a flexible metal hose, a circumferentially corrugated length of metal tubing, and a flexible covering enclosing said tubing formed of a soft rubber like material effective for substantially damping out vibration of said tubing.

3. In a flexible metal hose, a circumferentially corrugated length of metal tubing, and a flexible covering enclosing said tubing formed of a soft rubber like material adhering to said tubing effective for substantially damping out vibration thereof.

4. In a flexible metal hose, a circumferentially corrugated length of metal tubing, and a flexible covering enclosing said tubing and substantially filling the exteriorly opening corrugations thereof, said covering being of a soft rubber like material adhering to said tubing and effective for substantially damping out vibration thereof.

5. In a flexible metal hose, a circumferentially corrugated length of metal tubing, and a covering enclosing said tubing in intimate contact therewith formed of a material highly absorbent of vibrations thereof effective for substantially damping out vibration of said tubing in the audible range.

6. A flexible metal hose intended for use under conditions requiring prevention of transmission of sound thereby, said hose comprising a plurality of concentric elements, the innermost one of said elements being a seamless corrugated metal tube with alternate corrugations thereof opening freely outward, and a covering of highly flexible material extending into and filling the outwardly opening corrugations of said tube in intimate contact therewith and extending outward from said corrugations providing a covering of appreciable thickness over the exterior surface of said tube, said material being highly absorbent of vibrations of said tube effective for substantially damping out vibrations thereof in the audible range.

7. A flexible metal hose intended for use under conditions requiring prevention of transmission of sound thereby, said hose comprising a plurality of concentric elements, the innermost one of said elements being a seamless corrugated metal tube with alternate corrugations thereof opening freely outward, a covering of highly flexible material extending into and filling the outwardly opening corrugations of said tube in intimate contact therewith and extending outward from said corrugations providing a covering of appreciable thickness over the exterior surface of said tube, said material being highly absorbent of vibrations of said tube effective for substantially damping out vibrations thereof in the audible range, a second covering of vibration damping material disposed over said first covering in intimate contact therewith, and a highly flexible braided metal sheath disposed over said second covering in intimate contact therewith.

LEWIS B. DOANE.
FRANK B. BENTLEY.

REFERENCES CITED

The following references are of record in the file of this patent:

UNITED STATES PATENTS

| Number | Name | Date |
|---|---|---|
| 219,596 | Perry | Sept. 16, 1879 |
| 910,104 | Witzenmann | Jan. 19, 1909 |
| 1,314,333 | Kahn | Aug. 26, 1919 |
| 1,816,740 | Ogren | July 28, 1931 |
| 1,974,285 | Maclachlan | Sept. 18, 1934 |
| 2,079,598 | Berkowitz | May 11, 1937 |
| 2,150,471 | Van Vulpen | Mar. 14, 1939 |
| 2,256,386 | Farrar et al. | Sept. 16, 1941 |
| 2,330,651 | Welger | Sept. 28, 1943 |